United States Patent [19]
Purcell

[11] 3,774,704
[45] Nov. 27, 1973

[54] PORTABLE HYDRAULIC LIVESTOCK SCALE

[76] Inventor: Robert J. Purcell, P.O. Box 626, Garibaldi, Oreg. 97118

[22] Filed: May 30, 1972

[21] Appl. No.: 258,092

[52] U.S. Cl. .............................. 177/126, 177/209
[51] Int. Cl. ...................... G01g 21/00, G01g 5/04
[58] Field of Search .................. 177/126, 208, 209, 177/254

[56] References Cited
UNITED STATES PATENTS

| | | | |
|---|---|---|---|
| R24,556 | 10/1958 | Eckman | 177/209 |
| 2,823,911 | 2/1958 | Murphy | 177/126 UX |
| 2,264,909 | 12/1941 | Kelly | 177/209 |
| 2,835,484 | 5/1958 | Bradley | 177/209 |
| 2,962,276 | 11/1960 | Thurston | 177/126 |

*Primary Examiner*—George H. Miller, Jr.
*Attorney*—James D. Givnan, Jr.

[57] ABSTRACT

A collapsible scale having hydraulic pressure responsive cells in support of an animal weighing platform. Ramp components are detachable from the main portion of the scale as is an instrument stand facilitating the collapsing of the scale for pick-up truck transport to a remote livestock weighing site. Conduit means communicating the cells with a pressure indicator on the instrument stand includes a flexible component allowing detachment and repositioning of the stand without conduit separation. Adjustable pre-loading means for the cells and conduit means permit pressurizing of same prior to start of a weighing operation.

4 Claims, 6 Drawing Figures

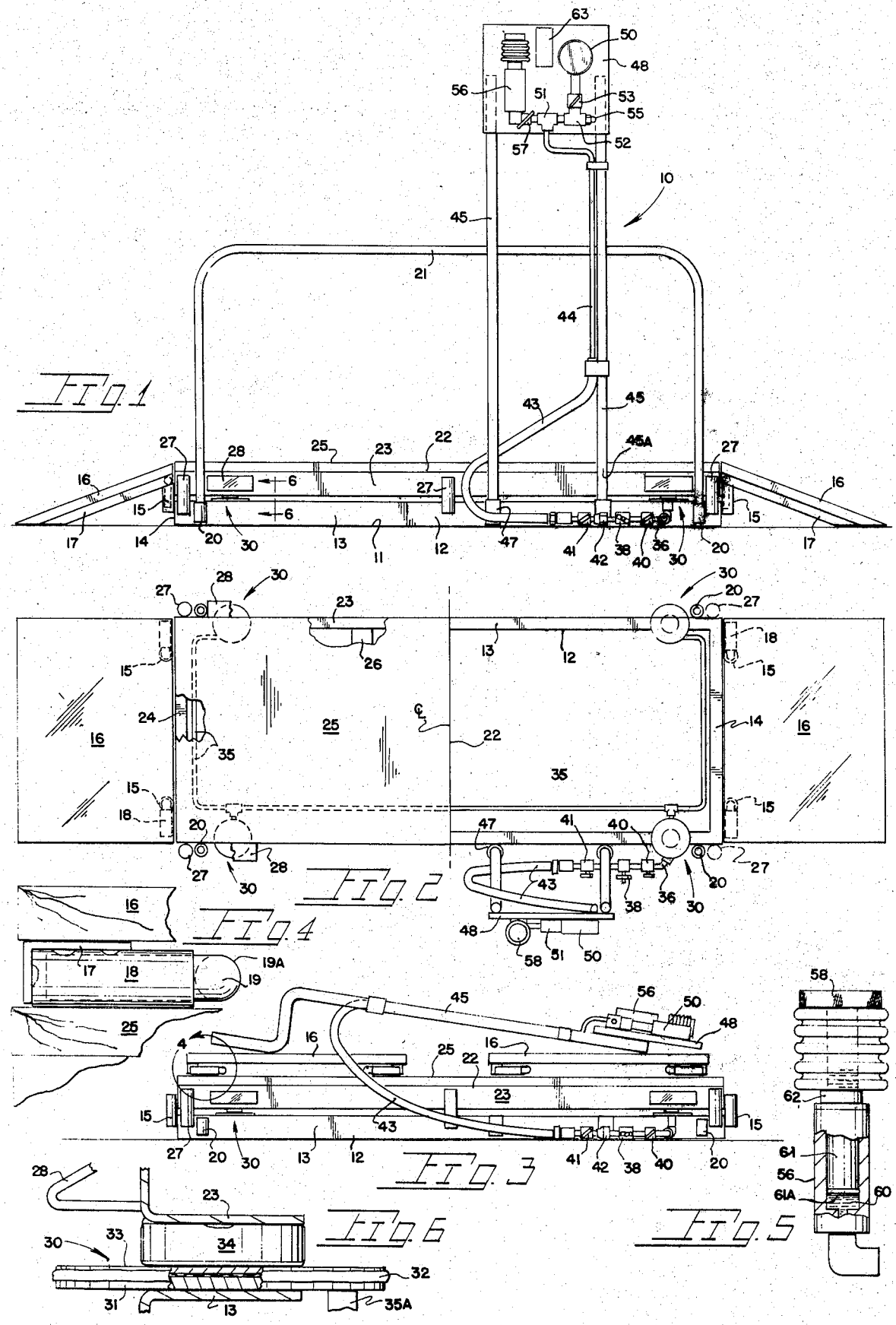

PORTABLE HYDRAULIC LIVESTOCK SCALE

BACKGROUND OF THE INVENTION

The present invention relates generally to portable scales for use in weighing livestock at various sites and more specifically to such a scale having hydraulic components operable to transmit a force imparted during a weighing operation.

Existing scales for livestock are for the most part of the permanently mounted type for weighing of animals at the time of sale. Such scales are complex and somewhat delicate and hence do not lend themselves to repeated moves or use at remote outdoor sites.

In the operation of a livestock endeavor such as cattle ranching, dairy farming and the like it is highly desirable to periodically weigh the animals for purposes of determining growth rates permitting the culling out of those animals having an unacceptable rate of growth. The more frequently the weighing operation can be performed the greater the selectivity the operator has to which animals should be disposed of. Heretofore, weighing of animals on a periodic basis was complicated by their necessary transport to and from a stationary scale which resulted in such weighing being economically impractical with the culling out of undesirable animals being left largely to the ranchers visual impression.

A further drawback to known scales is their complexity resulting in their not only being of high initial cost but costly from a maintenance standpoint.

SUMMARY OF THE INVENTION

The scale embodying the instant invention is primarily for use in the weighing of livestock at various outdoor sites and accordingly includes separable components enabling the scale to be collapsed for convenient transport within a small space as for example the bed of a pick-up truck. Important to the portable nature of the scale are fluid pressure cells of rugged construction in communication with a pressure reading gauge to provide s scale able to withstand severe impacts as would be encountered traveling from one remote outdoor weighing site to another.

The present scale includes a base on which are mounted pressure cells which in turn support a weighing platform removably mounted upon said base. The pressure cells are in communication with one another with each comprising upper and lower plate members within which is confined a fluid. The upper plate member of each cell flexes in a very limited manner during weighing operation to pressurize the fluid media which pressure is read on a pressure gauge by the scale operator. Conduit means communicating the cells with said pressure gauge includes a flexible segment and shut off valves which conribute to the ease of collapsing and setting the contribute up at the new site. Means are provided for pre-pressurizing the fluid which causes the pressure cells to be more responsive to imparted weights. Further, a gauge may be provided with a settable face to permit a zero reading at the start of a weighing operation even through the fluid system of the scale has been pre-pressurized. Off and on ramps as well as guard rails are removably mounted to the scale base permitting rapid detachment and set up at a new weighing site.

It is an important object of the present invention to provide a livestock scale transportable within the box of a small pick-up truck to enable the conducting of periodic weighing operations at remote outdoor sites. Certain components of the scale are readily detachable for compact stowage for travel to the next site whereat weighing may be initiated without time consuming calibration of same.

A further important object is the provision of a scale utlizing a captive fluid which by means of multiple pressure cells and a pressure gauge can perform livestock weighing to the accuracy required. Necessary to achieve this object are pressure cells of extremely durable design not susceptible to damage during the repeated loadings and unloadings or during transit over unimproved roads where the use of scales having ordinary weighing mechanisms is prohibited by reason of the severe treatment encountered in such loadings and transport.

BRIEF DESCRIPTION OF THE DRAWING

In the accompanying drawing:

FIG. 1 is a side elevational view of the present livestock scale in operable configuration, FIG. 2 is a plan view of FIG. 1 with the weighing platform broken away along the scales transverse centerline, FIG. 3 is a side elevational view of the scale collapsed for transport, FIG. 4 is an enlarged detail view of that portion of the scale encircled at 4 in FIG. 3, FIG. 5 is a detailed view of means for pre-pressurizing the hydraulic system of the scale, and FIG. 6 is an enlarged detail view of a pressure cell taken along line 6 — 6 of FIG. 1.

DESCRIPTION OF THE PREFERRED EMBODIMENT

With continuing reference to the accompanying drawing wherein applied reference numerals indicate parts similarly identified in the following specification, the reference numeral 10 indicates generally a scale embodying the present invention shown in place on a supporting surface 11 which, in the case of outdoor use, may be a level ground area.

A base 12 of the scale is of rectangular shape and may be a framework of end welded channel iron members to provide a rigid support for the remaining scale components. Base 12 comprises longitudinal members 13 and end members 14 to which are welded a plurality of components described below. Pairs of sockets 15 welded to each end member 14 of the base serve to retain the elevated ends of a pair of ramps 16. Each ramp 16 includes a pair of angle iron reinforcing members 17 one of which is shown endwise in FIG. 4 with the uppermost ends of each angle iron mounting a horizontally disposed, inwardly projecting collar 18. Swingably mounted within each of said collars is a connector 19 of right angular configuration with a distal end 19A insertable within base mounted socket 15. FIG. 4 shows the connector disengaged from its socket and swung upwardly against the ramp permitting compact stowage of the ramp as seen in FIG. 3.

Also carried by base 12 are railing sockets 20 within which the lower ends of iron pipe railings 21 are removably mounted. In instances where the scale is set up within a livestock chute the railings may be dispensed with.

Indicated at 22 is a weighing platform superimposed on base 12 and being of like dimension, as best viewed in FIG. 2. In continuing similarity to base 12 the weighing platform may also be of welded channel iron construction with longitudinal members 23 and end members 24. A livestock treadway is provided in the form of a one inch plywood panel 25 secured along its perimeter to platform members 23-24. Located at intervals below platform 25 are transversely extending braces 26 welded intermediate the longitudinal members 23. For the purpose of retaining the weighing platform in place on base 12 against lateral displacement I provide a plurality of corner located retainers 27, shown as tubular segments, welded at their upper ends to the ends of longitudinal members 23 of the weighing platform. The sockets 15, supporting inner or elevated ends of ramps 16, prevent longitudinal displacement of the weighing platform as the sockets extend upwardly adjacent the platform end members 24.

Interposed between base 12 and weighing platform 22, adjacent each of their four corners are identical pressure cells indicated generally at 30. With attention to FIG. 6 wherein a typical pressure cell is shown, the same includes a circular base plate 31 permanently secured in place upon a longitudinal base member 13. A peripheral weld 32 serves to secure a flexible metal disc 33 in a fluid tight manner to its base plate 31. In a satisfactory embodiment the pressure cell 30 may include a base plate of 1/8 inch thick metal while the disc 33 may be of 1/16 inch thickness both with a diameter of approximately 4 inches. Pre-pressurization or pre-loading of the fluid system, as later described, causes disc 33 of each cell to be deformed upwardly with a resulting chamber forming between said plate and disc confining a pressurized fluid charge therein. In resting engagement upon the central portion of the upper surface of each disc 33 is a foot 34 secured to the underside of the weighing platforms longitudinal member 23. Also carried by said longitudinal member is an inclined guard 28 for each pressure cell 30.

With reference to FIG. 2 it will be seen that the interior or chamber of each pressure cell is in communication via fluid conduit means 35 and fittings 35A with the remaining pressure cells. A pressure lead at 36, also part of said conduit means, serves to relay fluid pressure resulting from forces imparted to each of the four cells. For the sake of convenience each pressure cell 30 may be additionally provided with a bleed (not shown) allowing bleeding of the entire fluid system should air become entrapped in the system. Bleeding of the fluid system may additionally be accomplished by a main bleed 38 in said conduit means. In adjacent fluid communication with bleed 38 are a pair of shut off valves 40-41 with a conduit coupling at 42 permitting convenient separation of the conduit means, if desired, below shut off 41. Accordingly, closing of the two shut off valves 40-41 may be accomplished prior to separation of the conduit means at coupling 42 in collapsing the scale for extended travel with subsequent set up of the scale involving only recoupling and bleeding at bleed 38 of the intermediate length of conduit between shut off valves 40-41. As later elaborated upon, in some instances, it is feasible and highly desirable to leave the conduit means intact during collapsing of the scale, as for example, where the anticipated travel is of short duration.

A flexible hose segment 43 of the conduit means communicates shut off valve 41 with a line 44 the same being secured along one of a pair of tubular supports 45 of an instrument stand. The supports 45 are of irregular configuration at 45A for purposes of offsetting the stand are are retained in vertical disposition by engagement of their lower ends in an inserted manner within sleeves 47 carried by longitudinal base member 13. The upper ends of the supports 45 serve jointly to carry an elevated instrument mounting board at 48. Fluid pressure indicator means, shown as a gauge 50, is secured to the instrument board 48 and is preferably of the type having a settable gauge face permitting setting of a zero pressure reading regardless of the gauge pointer position indicating fluid pressure existing within the cells and conduit means. Fluid pressure in line 44 is communicated to gauge 50 via a Tee fitting 51 while a second Tee at 52 is used in conjunction with a shut off valve 53 the latter being used for the purpose of dampening severe pressure fluctuations in the system. The remaining port of Tee fitting 52 is provided with a check valve 55, which in a preferred form of the invention, may be a ball check valve past which fluid may be added from a pressurized source to the system at intervals if required.

To enable the fully charged fluid system to be pre-pressurized or pre-loaded to a value between 30 to 60 PSI for example, adjustable pressurizing means are provided at 56 in communication with the conduit means at Tee 51 via a shut off valve 57. The adjustable pressurizing means 56, as best shown in FIG. 5, includes a main body 56 having a fluid charged chamber 60 within which a piston 61 may travel by reason of a threaded segment thereof being in engagement with an internally threaded boss 62 on the main body 56. The adjustable pressure means 56 is set by rotation of a handle 58 for advancement of retraction of the O-ring equipped piston end 61A with respect to the lower end of chamber 60. Accordingly, with a fluid system fully charged and the piston 61 retracted to allow the chamber 60 to receive a maximum quantity of fluid not only may the system be pre-loaded prior to the start of a weighing operation by advancement of piston 61 but also a fluid reserve is embodied within the volume of fluid in chamber 60. Pressure gauge 50 subsequent to system pressurizing and before the start of the weighing operation is reset to a zero reading. The pressure readings from gauge 50 during a weighing operation may be readily translated into pounds on a conversion table 63 provided on the instrument mounting board 48. Said table may be based upon a pre-determined pressure value existing in the system prior to the start of weighing.

The shut off valve 57 may be closed upon the system being pre-loaded to the pressure desired whereafter any seepage past the O-ring on piston 61 is of no consequence.

The operation of the present scale is believed to be apparent from the foregoing description. Collapsing of the scale is accomplished by the upward extraction of the connector ends 19A from their respective sockets 15 with subsequent swinging of said connector ends upwardly against the underside of the ramp enabling the ramps to be compactly placed on the weighing platform as shown in FIG. 3. The instrument stand and specifically the supports 45 are disengageable from the base mounted sleeves 47 to permit the instrument stand to be collapsed to the generally horizontal position of FIG. 3 such being possible without disconnecting of the conduit means. As earlier mentioned, in certain instances it may be desirable to disconnect coupling 42 subsequent to the closing of shut off valves 40-41 with the later setting up of the scale necessitating only the bleeding of the conduit means intermediate said shut off valves by means of bleed 38.

The weighing of livestock with the present scale may be done in a rapid manner with the conversion of the pressure reading indicated on gauge 50 being done at the time of weighing. As the pre-loaded pressure value is known prior to the start of a weighing operation, the conversion of a pressure indicated during weighing of an animal may be quickly accomplished by means of the table 63. Obviously, gauge 50 may be of the type having a settable face reading in pounds to avoid conversion of pressure readings to pounds.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

1. A collapsible hydraulic scale conveniently transportable to remote locations for the weighing of livestock, said scale comprising, a base of rectangular configuration, ramps attachable to opposite ends of said base, a weighing platform on said base, means confining said platform in place on said base, pressure cells intermediate said platform and the base each including a flexible disc component deformable upon preloading of the pressure cells with a fluid charge, an instrument stand removably attached to one side of said base, conduit means including a flexible hose segment located adjacent said instrument stand permitting detachment of the stand from the base and horizontal repositioning of the stand during collapsing of the scale for travel without disconnecting said conduit means, pressure indicating means located on said stand for viewing by a scale operator and in fluid communication with said conduit means for indicating fluid pressure resulting from a weighed load on the platform, and pressurizing means located on said stand for preloading said pressure cells and said conduit means, said pressurizing means additionally adapted to store a quantity of fluid for replenishment of the scales fluid supply.

2. The scale as claimed in claim 1 wherein said platform confining means includes ramp supporting sockets secured to the base of the scale and extending upwardly therefrom additionally serving to receive insertable ramp components.

3. The scale as claimed in claim 2 wherein said insertable ramp components comprise swingably mounted connectors carried at the upper ends of said ramps, said connectors upon disengagement from their base carried sockets during collapsing of the scale being upwardly positionable against their respective ramps for purposes of compact ramp stowage.

4. The scale as claimed in claim 3 wherein said conduit means includes a flexible hose segment located adjacent said instrument stand permitting detachment of the stand from the base and horizontal repositioning of the stand during collapsing of the scale for travel without disconnecting said conduit means.

* * * * *